US010427967B2

(12) United States Patent
Baratta

(10) Patent No.: US 10,427,967 B2
(45) Date of Patent: Oct. 1, 2019

(54) PROCESS FOR THE MANUFACTURE OF A GLASS CONTAINER, GLASS CONTAINER AND RELATED USES

(71) Applicant: BORMIOLI LUIGI S.p.A., Parma (PR) (IT)

(72) Inventor: Simone Baratta, Parma (IT)

(73) Assignee: BORMIOLI LUIGI S.P.A., Parma (PR) (IT)

(*) Notice: Subject to any disclaimer, the term of this patent is extended or adjusted under 35 U.S.C. 154(b) by 494 days.

(21) Appl. No.: 15/013,749

(22) Filed: Feb. 2, 2016

(65) Prior Publication Data

US 2016/0236962 A1     Aug. 18, 2016

(30) Foreign Application Priority Data

Feb. 3, 2015    (IT) .............................. MI2015A0136

(51) Int. Cl.
*C03B 23/00* (2006.01)
*C03B 27/00* (2006.01)
(Continued)

(52) U.S. Cl.
CPC .............. *C03B 23/207* (2013.01); *B65B 5/04* (2013.01); *B65D 13/02* (2013.01); *B65D 15/24* (2013.01);
(Continued)

(58) Field of Classification Search
CPC ........ C03B 23/006; C03C 27/00; C03C 27/06
See application file for complete search history.

(56) References Cited

U.S. PATENT DOCUMENTS 3,113,878 A * 12/1963 Martin .................... C03C 3/066
501/5
3,346,357 A * 10/1967 Baak ..................... C03B 23/207
501/2
(Continued)

FOREIGN PATENT DOCUMENTS

JP          62-230646 A       10/1987
WO       03/097546 A1       11/2003
WO      2006/037889 A1       4/2006

OTHER PUBLICATIONS

Machine translation of WO 2006/037889 (Year: 2006).*
(Continued)

*Primary Examiner* — Cynthia Szewczyk
(74) *Attorney, Agent, or Firm* — Hedman & Costigan, P.C.; James V. Costigan; Kathleen A. Costigan

(57) ABSTRACT

The present invention relates to a process for the manufacture of a glass container that comprises the steps of: a) providing a first glass element; b) providing a second element made of a material selected from: glass, ceramic, metal and metallic alloy; said first element and said second element, joined together, defining a containment cavity of said glass container; c) depositing a sealing composition comprising at least one glass frit dispersed in at least one dispersing liquid on at least one surface of at least one of said first element and said second element; d) positioning said first element and said second element in contact with each other so that said sealing composition is arranged between said first element and said second element; e) heating said sealing composition so as to melt said glass frit and form a sealing layer between said first element and said second element. The present invention further relates to a glass container, such as, for example, a bottle, a cup or a jar, and related uses.

12 Claims, 2 Drawing Sheets

(51) Int. Cl.
- *C03B 27/06* (2006.01)
- *C03B 23/207* (2006.01)
- *B65D 13/02* (2006.01)
- *C03C 3/062* (2006.01)
- *C03C 8/02* (2006.01)
- *C03C 8/18* (2006.01)
- *C03C 8/24* (2006.01)
- *C03C 27/06* (2006.01)
- *B65B 5/04* (2006.01)
- *B65D 8/00* (2006.01)
- *C03C 3/064* (2006.01)
- *C03C 27/04* (2006.01)
- *C03B 9/14* (2006.01)

(52) U.S. Cl.
CPC ............. *C03C 3/062* (2013.01); *C03C 3/064* (2013.01); *C03C 8/02* (2013.01); *C03C 8/18* (2013.01); *C03C 8/24* (2013.01); *C03C 27/042* (2013.01); *C03C 27/06* (2013.01); *C03B 9/14* (2013.01)

(56) References Cited

U.S. PATENT DOCUMENTS

2006/0283546 A1* 12/2006 Tremel .................... C03C 3/066
 156/291
2009/0297862 A1  12/2009 Boek
2012/0282407 A1* 11/2012 Singh ...................... C03C 8/06
 427/376.3

OTHER PUBLICATIONS

Italian Search Report, dated Sep. 25, 2015 (in corresponding application).
English Abstract of JP 62-230646 dated Oct. 9, 1987.

* cited by examiner

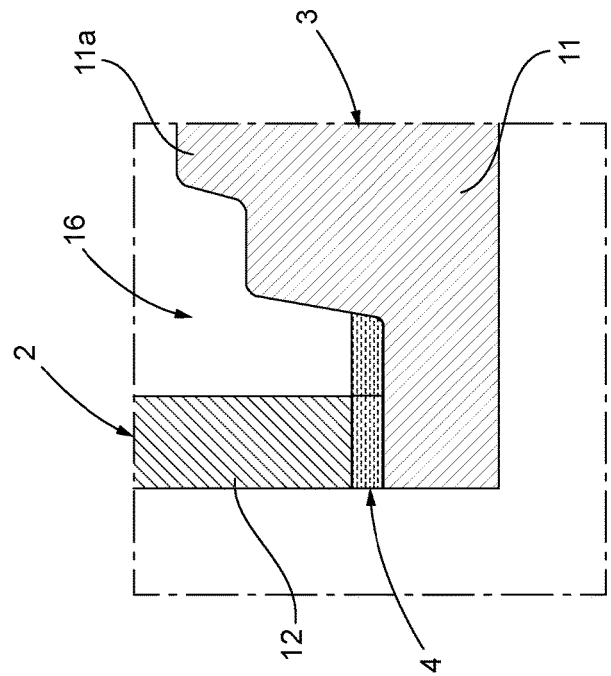
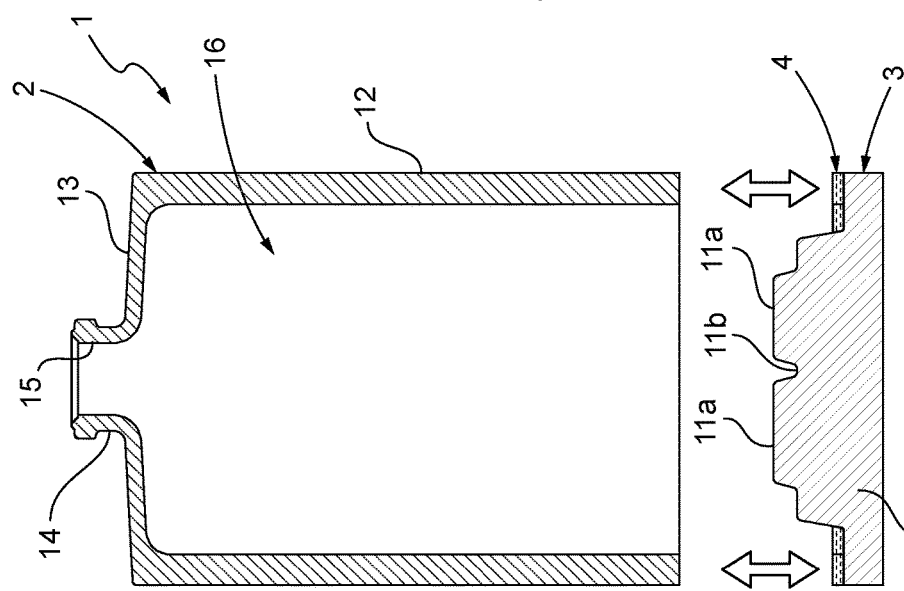

PROCESS FOR THE MANUFACTURE OF A GLASS CONTAINER, GLASS CONTAINER AND RELATED USES

The present invention relates to a process for the manufacture of a glass container, such as a bottle, a cup or a jar. The present invention further relates to a glass container and related uses.

In the production of consumer goods intended to be packaged in glass containers, such as, for example, cosmetic, pharmaceutical and food products, there is the need to dispose of containers characterized by an aesthetic appearance able to attract the consumer's attention. The aesthetic form of a container, in fact, can have a significant influence on the purchasing decisions of consumers.

In the state of the art, there are several techniques of glass forming which make it possible to obtain containers of various shapes and aesthetic finishes.

The "blow and blow" technique, for example, is a forming technique used to manufacture containers intended to contain cosmetic compositions (e.g. perfumes) and beverages (e.g. liquors). This technique is particularly suitable for manufacturing narrow-neck containers, such as a bottle. This technique, while capable of easily modelling the outside appearance of the container, does not however give any possibility to model the profile of its inner cavity—in particular of the bottom of the container—to obtain, for example, particular geometries of glass distribution and then customs designs.

Other glass forming techniques, as the "pressing" ("press")—typically used for the manufacture of glass articles for domestic use, such as jars (so-called tableware)—or the "press and blow" technique—used for example in the production of goblets—allow to create containers having particular geometries of glass distribution in their inner cavity, capacity/weight ratios and aesthetic finishes different from those of containers used for perfumes and liquors. However, these techniques, are generally not suitable for the manufacture of containers designed for the perfumery or liquor sectors, as these techniques do not allow neither realizing narrow-neck containers nor modeling the external profile according to the needs.

In the state of the art methods are also known which are based on the use of adhesive compositions to join two glass elements, for example to repair or manufacture domestic glass articles (e.g. window glass, glazing for aquariums, furnishing objects, etc.).

The adhesive compositions typically used in these applications are thermosetting polymeric glues, hot-melt or photocurable glues such as acrylic or silicone glues. These glass glues, ensure sufficient stability and mechanical strength of the glued object under its normal conditions of use, but have the disadvantage of containing toxic substances that preclude their use in the event that these objects are intended to come into contact with food, cosmetic and pharmaceutical products.

Moreover, because of their chemical composition, these glues do not guarantee bonding stable over time in case of prolonged contact of the glued object with alcoholic substances (e.g. the alcohol content of perfumes and liquors) or in the case that the glued object is exposed to wearing conditions (e.g. repeated washes with alkaline detergents, contact with liquids at high temperature).

An additional disadvantage of the glass glues of the state of the art is represented by the undesired release of chemical substances from the glue to the product enclosed within the container.

Taking into account the above-mentioned disadvantages, glass glues have so far found only a limited application in the manufacture of glass containers for cosmetic, food and pharmaceuticals. These glues, in fact, may only be applied on the surfaces of a container that are not exposed to any contact with the product present in the container (e.g. the external surface) or the surfaces properly protected against such contact.

As an alternative to using polymeric glass glues, it is also known to join two glass elements using glass frits-based compositions. These compositions are employed, for example, in the electronics industry to manufacture light emitting devices (e.g. OLED devices) or photovoltaic devices.

US 2009/0297862 A1 discloses for example a process for manufacturing glass devices comprising two glass plates joined together by a glass frit. Electronic components (e.g. electrodes) may possibly be inserted between the plates. According to US 2009/0297862 A1, a fluid dispersion containing the glass frit is deposited on a first glass plate and heated to a temperature lower than the glass transition temperature (TO of the frit in order to promote the adhesion of the frit to the plate. Subsequently, another plate is located on the frit adhered to the first plate in order to form an assembled product. The assembled product is heated at a second temperature—higher than the $T_g$ and lower than the crystallization temperature of the frit—so as to melt the frit and form a sealing layer which joins together the two plates. The sealing layer prevents the entry of both oxygen and humidity in the cavity of the assembled product, thereby protecting its content from exposure to these atmospheric agents.

The glass frit disclosed in US 2009/0297862 A1 has a $T_g$ of about 325° C. and a melting point of about 400° C. According to a preferred embodiment, the glass frit is a Sb—V-phosphate glass.

WO 2006/037889 discloses a container obtained by welding two glass portions each other with a welding material having a melting temperature lower than the melting temperature of the glass forming said portions. This welding material is exemplified as an enamel ("émail" in French). WO 2006/037889 however does not provide any details about the chemical composition and the method of preparation of said enamel.

In view of the above-described state of the art, the Applicant has set itself the primary aim of providing a process for the manufacture of glass containers in a wider variety of shapes with respect to the processes known in the state of the art.

Under this aim, it is a scope of the present invention to provide a process for manufacturing glass containers that allow in particular to widen the variety of shapes that can be conferred to the internal surface of said containers.

A second scope of the present invention is to provide a process for manufacturing glass containers in a wider variety of shapes than the processes of the state of the art, said containers being able to meet also the technological requirements set out for packagings intended for packing cosmetic, food and pharmaceutical products (e.g. mechanical strength, chemical resistance, resistance to thermal shocks, etc.) as well as the safety requirements of the products they contain (e.g. a limited release of substances from the container to the product contained therein).

A third scope of the present invention is to provide a glass container shaped in a wider variety of shapes than the containers of the state of the art.

A fourth scope of the present invention is to provide a glass container comprising two or more elements, at least one of which is made of glass, these elements being assembled together with a sealing composition, that can be used for packaging cosmetic, food and pharmaceutical products.

The Applicant has now found that the above mentioned and other aims, which will be better illustrated in the description below, may be achieved by the present invention that, according to a first aspect, relates to a process for the manufacture of a glass container comprising the steps of:

a) providing a first glass element;
b) providing a second element made of a material selected from: glass, ceramic, metal and metallic alloy;
said first element and said second element, joined together, defining a containment cavity of said glass container;
c) depositing a sealing composition comprising at least one glass frit and at least one dispersing liquid on at least one surface of at least one of said first element and said second element;
d) positioning said first element and said second element in contact with each other so that said sealing composition is arranged between said first element and said second element;
e) heating said sealing composition so as to melt said glass frit and form a sealing layer between said first element and said second element.

According to a second aspect, the present invention relates to a glass container comprising at least one first glass element and a second element made of a material selected from: glass, ceramic, metal and metallic alloy, said first element and said second element being joined together with a sealing layer comprising a glass frit.

According to a third aspect, the present invention relates to the use of said glass container for containing a cosmetic, food or pharmaceutical composition.

In the present description by the term "glass container" it is meant a hollow body, partially or entirely made of glass, comprising at least one containment cavity suitable for containing a liquid composition and at least one opening for introducing said liquid composition in said containment cavity. The glass container may possibly be equipped with a closure (e.g. a plug) or other accessory elements (e.g. a handle).

In the present description by the term "bottle" it is meant a glass container comprising:
- a bottom which delimits the lower part of the containment cavity,
- a hollow body joined to said bottom and laterally delimiting said containment cavity,
- a neck joined to said body and having cross-section smaller than said body and suitable for being passed through by said liquid composition,
- a connector, commonly known as shoulder, which joins said body and said neck.

The process according to the present invention allows to manufacture glass containers in a wider variety of shapes with respect to the processes known in the art.

According to the present invention, the glass container is obtained by joining together two or more components (elements) with a sealing layer comprising at least one glass frit. The elements joined using said glass frit are elements which delimit, possibly together with other elements, the containment cavity of said glass container. In said glass container at least one of the elements is made of glass, whereas the remaining elements may be made of a material selected from: glass, ceramic, metal or metallic alloy.

By joining together elements made of the above mentioned materials, it is possible to manufacture containers having original aesthetic features, which otherwise would not be obtainable by using the glass forming techniques known in the art.

The use of glass elements coupled with elements made of a material different from glass allows to exploit the potentialities of the forming techniques of the different materials in order to obtain original aesthetic effects, thus widening the possibilities to personalize glass containers.

According to a preferred embodiment of the present invention, the glass container is obtained by joining together two or more glass elements with a sealing layer comprising at least one glass frit; preferably, the two glass elements are obtained using different glass forming techniques.

Joining together two or more glass elements, particularly if prepared by means of different forming techniques, allows to manufacture containers having aesthetic features which otherwise would not be obtainable by using only one of the glass forming techniques known in the art.

Particularly, the process according to the present invention allows to manufacture narrow-mouth glass containers (e.g. internal diameter within the range from 3 mm to 35 mm), such as bottle, flasks and jars, wherein the internal profile of the containment cavity may have shapes not obtainable by the blow-and-blow and press-and-blow techniques generally used in the art for the manufacture thereof.

The use of glass elements obtained using different forming processes allows to exploit the potentialities of each glass forming techniques known in the art in order to obtain new aesthetic effects, thus widening the possibilities to personalize glass containers.

The use of a glass frit-based sealing layer for welding two or more elements one another bestow the required features of tightness upon the containers and it ensures a stable assembling of the elements over time, also under wearing conditions of use (e.g. high temperature, contact with aggressive chemical substances, etc.). Moreover, since such sealing layer, is characterized by a high chemical stability (namely, low levels of substance release from the sealing layer to the container content), it is compatible with the prolonged contact of the container with food, cosmetic and pharmaceutical compositions.

The sealing layer which joins the elements is obtained by melting the glass frit, which is deposited in the form of a fluid sealing composition on the contact interface between the two elements.

The melting of the glass frit is carried out by heating the same at a temperature sufficiently high to cause its softening and consequently its intimate adhesion to the surface of the two elements. In some cases, the temperature at which the heating of the glass frit is carried out is not such to cause the softening of the elements made of glass or other material which are joined with said glass frit. In other cases, the heating may be carried out at temperatures higher than the softening temperatures of the elements, provided that it is localized only on the glass frit, affecting only in a negligible way the body of the elements (for example by means of a laser irradiation device).

The process according to the present invention may be used for manufacturing containers for different kinds of uses, such as bottles, cups, globets and jars, without any particular restrictions about sizes and shapes.

Preferably, the process is used for manufacturing containers for containing cosmetic compositions, such as perfumes, lotions and similar, food and pharmaceutical compositions.

According to a preferred embodiment, the glass container comprises at least two glass elements directly joined together through a sealing layer comprising a glass frit.

The glass elements may be formed by using a forming method selected from: pressing, blow-blow and press-blow.

Such methods are known to the person skilled in the art and they are widely described in the literature.

The "pressing" technique provides for the formation of a container into a mold, within which a melted glass mass, gob, is pressed by means of a plunger—inserted through an opening of the mold—against the internal wall of the mold, thus obtaining the desired form of the container.

The press-and-blow technique provides for the formation of a parison of the container in a first mold (blank mold), within which a gob is pressed by means of a plunger—inserted through an opening of the mold—against the internal wall of the mold, thus making a pre-form of the container (parison). The parison is then transferred into a second mold (blow mold), where compressed air is blown within the parison, so as to press its glass mass against the internal walls of the second mold and obtain the container in the final desired shape.

The blow-and-blow technique provides for the formation of a parison in a first mold as in the case of the press-blow technique. The parison, however, is formed by injecting compressed air instead of using a plunger. Once the parison is formed by blowing, forming is completed in a second mold, as in the case of the press-blow technique.

In certain embodiments, the above mentioned techniques may comprise operations of aspiration, rather than blowing, in order to make the cavity of the container.

The above mentioned forming techniques include the forming techniques known in the art as: "pressing", "blow and blow", "press-blow", "narrow nack press-and-blow".

According to a particularly preferred embodiment, the container may comprise two glass elements, possibly joined together with a sealing layer, wherein the first glass element is formed by a forming method selected from: pressing, blow-and-blow and press-blow and the second glass element is formed by a forming method selected from: pressing, blow-and-blow and press-blow, said second glass element being formed by a method different from the method used for forming said first glass element.

In a second preferred embodiment, the glass container comprises at least one first glass element obtained by a blow-and-blow process and at least a second glass element obtained through a press-blow process.

In a third preferred embodiment, the glass container comprises at least one first glass element obtained by a blow-and-blow process and at least a second glass element obtained by a pressing process.

In a fourth preferred embodiment, the glass container comprises at least two glass elements, possibly joined together by the glass frit, obtained by the same forming process (e.g. two elements formed by blow-and-blow or two elements formed by pressing).

The glass elements may be joined together directly by the sealing layer or indirectly by interposition of one or more further elements made of a material different from glass, said further elements being joined to the glass elements and/or together by the respective sealing layers.

When the container is a bottle, preferably the element formed by the blow-blow technique is selected from the following components: mouth, neck, shoulder and body.

According to a further preferred embodiment, the glass container is a bottle. In the case of the bottle, the element formed by the blow-blow technique may also comprises more than one of said components. A glass element formed by the blow-blow technique, for example, may comprise: mouth and neck (mouth-neck element); neck and shoulder (neck-shoulder element); shoulder and body (shoulder-body element); neck, shoulder and body (neck-shoulder-body element).

When the container is a bottle, preferably the element formed by the pressing or press-blow technique is the bottom.

According to the present invention, a glass container may be formed even by more than two glass elements joined together by the respective sealing layers. For example, a bottle may be obtained by assembling three distinct glass elements, such as: bottom, body and a shoulder-neck element.

In a further preferred embodiment, the elements which form the containment cavity of the container are made of glass.

Elements made of material different from glass are elements made of ceramic, metal or metallic alloys (e.g. natural stone, steel). Generally, materials usable for the purposes of the present invention resist to heating at the melting temperatures of the glass frits adopted for forming the sealing layer, without presenting appreciable shape alterations (e.g. due to the material softening) and without decomposing.

The process according to the present invention may be used for manufacturing containers wherein the chemical composition of the glass may range within broad limits.

Preferably, the glass elements are made of soda-lime or boron-silicate glass, more preferably soda-lime glass.

Generally, where two glass elements are joined together by the glass frit, they may have the same chemical composition or different chemical composition. Preferably, the glass of the first glass element has the same composition or composition similar to that of the glass of the second glass element to which said first element is joined.

According to a preferred embodiment, all the glass elements of the container are made of soda-lime glass.

Preferably, glass which forms the glass elements does not contain Pb, Cd, Cr (VI) and Hg.

In order to join together two elements of the container, according to the present invention, a sealing composition is used, which comprises at least one glass frit suspended in at least one dispersing liquid.

Preferably, the glass frit is present in the sealing composition in an amount within the range of 50-90% by weight with respect to the weight of the sealing composition, more preferably within the range of 60-80% by weight.

The glass frit composition is selected as a function of the material composition of the elements to be joined. Particularly, the composition of the glass frit is selected so that the value of the thermal expansion coefficient is close as much as possible to the value of thermal expansion coefficient of the glass of the elements to be joined.

Preferably, the glass frit has a thermal expansion coefficient within the range of $10\text{-}100 \cdot 10^{-7}$ $K^{-1}$.

When soda-lime glass elements are used, preferably the thermal expansion coefficient is within the range of $80\text{-}90 \cdot 10^{-7}$ $K^{-1}$.

When boron-silicate glass elements are used, preferably the thermal expansion coefficient is within the range of $30\text{-}50 \cdot 10^{-7}$ $K^{-1}$.

The glass frit used for the containers intended to enter in contact with food, cosmetic and pharmaceutical products, preferably has a composition which is such to ensure that, under normal conditions of use of the container, the undesired release of substances from the frit to content of the container does not occur.

Preferably, the glass frit does not contain one or more of the following elements: Pb, Cd, Hg, Cr (VI), where the wording "does not contain" means that such chemical elements are not purposely added to the glass composition and, in any case, the sum of the concentrations of each of them (expressed as Pb, Cd, Hg and Cr) is lower than 0.01% by weight with respect to the glass weight.

Preferably, the glass frit has a melting temperature within the range of 500-700° C., more preferably within the range of 550-650° C.

According to a preferred embodiment of the present invention, the glass frit comprises at least $SiO_2$ as network forming compound and $Bi_2O_3$ as main oxide for adjusting the melting temperature.

Preferably, the concentration of $SiO_2$ is within the range of 20%-40% by weight of the frit weight.

Preferably, the concentration of $Bi_2O_3$ is within the range of 30%-70% by weight of the frit weight.

In order to limit the risks of release of undesired substances from the glass frit to the product contained within the container and to confer resistance to chemical agents (e.g. alcohols) upon the sealing layer, the glass frit comprises alkaline metals in an amount lower than 7% by weight of the glass frit weight, preferably within the range of 1-7% by weight.

The glass frit may also comprise alkaline-earth metal oxides in an amount of from 0.5% to 3% by weight of the glass frit weight.

The glass frit further comprise oxides which stabilizes the glass network. Preferably, the stabilizing oxides are selected from: transition metals oxides, $Al_2O_3$ and $P_2O_5$.

The total concentration of stabilizing oxides in the glass frit is preferably within the range of 1-25% by weight of the glass frit weight.

Particularly preferred transition metals are: Ti, Zn, Zr and V.

When present, the concentration of each of $Al_2O_3$ and $P_2O_5$ oxides is preferably not higher than 2% by weight of the frit weight.

The said $SiO_2$—$Bi_2O_3$-based glass frits having a low content of alkaline and possibly alkaline-earth metal oxides have a melting temperature within the temperature range at which the annealing processes of glass containers, particularly of the soda-lime glass containers, are generally carried out. This allows the process of the present invention to be easily integrated within an industrial manufacturing process of glass articles.

Furthermore, the thermal expansion coefficient of the $SiO_2$—$Bi_2O_3$-based frits is very similar to that of the soda-lime glass. During the cooling of the melted glass frit up to ambient temperature, such property of the thermal expansion coefficient allows to reduce the accumulation of mechanical stresses at the contact interface between the sealing layer and the elements, particularly soda-lime glass elements, thus ensuring a high mechanical strength of the junction sealing layer.

According to a particularly preferred embodiment, the glass frit comprises (percentages by weight referred to the total weight of the frit):
(i) 20%-40% $SiO_2$;
(ii) 30%-70% $Bi_2O_3$;
(iii) 1%-7% alkaline metal oxides;
(iv) 1%-25% stabilizing oxides selected from: transition metal oxides, $Al_2O_3$ and $P_2O_5$.

According to a further preferred embodiment, the glass frit has the following composition (percentages by weight referring to the total weight of the frit):
(i) 20%-40% $SiO_2$;
(ii) 30%-70% $Bi_2O_3$;
(iii) 1%-7% alkaline metal oxides;
(iv) 1%-25% stabilizing oxides selected from: transition metal oxides, $Al_2O_3$ and $P_2O_5$;
(v) 0-20% pigments.

The glass frit may be colored. For these purpose, one or more pigments (or precursor compounds of such pigments) may be added during the preparation of the glass frit. Preferably, the pigment concentration is within the range of 1-20%, more preferably 3-15% by weight of the glass frit weight.

One or more pigments may be also added to the sealing composition separately from the frit and possibly in addition to the pigments present in the latter. Preferably, the pigment concentration in the sealing composition is within the range of 2-15% by weight, preferably within the range of 2-10% by weight, with respect to the weight of the sealing composition.

In certain embodiments, it is preferable to have a transparent sealing layer. In these cases, the glass frit and the sealing composition substantially do not contain pigments.

The glass frits are used in the form of fine powder. Preferably, the average particle diameter of the glass frit is within the range of 1-100 micrometers, more preferably within the range of 2-25 micrometers, even more preferably within the range of 5-10 micrometers.

The glass frits having the above-described features, particularly the chemical composition, the thermal expansion coefficient values and the melting temperature, are particularly suitable for joining elements made of soda-lime glass or elements made of boron-silicate glass.

The dispersing liquid used in the sealing composition for dispersing the glass frit and the possibly further solid components is a liquid that does not quickly evaporate at room temperature and which is able to maintain the solid fraction of the sealing composition in suspension for enough time to allow its deposition on the surface of the glass element.

Preferably, the dispersing liquid is a liquid or a mixture of liquids having a viscosity sufficient to maintain the solid fraction of the sealing composition in suspension.

Preferably, the viscosity at 25° C. of the dispersing medium is within the range of 50-200 centistokes (13 s-54 s, according to ASTM D1200 (Ford 4 cup)).

The dispersing liquid, for example, may be selected from: water, hydrocarbon compounds and mixtures thereof.

Preferably, the dispersing liquid has a boiling temperature (at atmospheric pressure) within the range of 50-350° C., more preferably within the range of 90-300° C.

Preferably, the dispersing liquid comprises a mixture of water and at least one organic compound, preferably a polar organic compound, such as $C_2$-$C_{12}$ polyols. Examples of usable polyols are: dipropylene glycol, butyl glycol (2-butoxy-ethanol) or glycerin. Preferably, in the dispersing liquid the ratio by weight water:organic compound is in the range from 1:1 to 20:1.

Preferably, the dispersing liquid is present in the sealing composition in an amount within the range 20-40% by weight with respect to the weight of the sealing composition.

The dispersing liquid may also contain dispersing agents to favor the suspension of the solid fraction of the sealing composition and wetting agents to promote the adhesion of the sealing composition to the glass element surface. As dispersing and wetting agents, for example, surfactant compounds may be used, such as fatty acid esters.

Preferably, dispersing and wetting agents are present in the sealing composition in a total amount within the range of 0.5-10% by weight with respect to the weight of the sealing composition.

If the solid fraction has a high fineness, the dispersing liquid may be also water, possibly added with dispersing and/or wetting agents.

The viscosity of the sealing composition may vary depending on the technique used for its deposition on the glass element and the conditions of application (e.g. deposition on vertical or horizontal surfaces).

Preferably, the viscosity at 25° C. of the sealing composition is within the range of 70-150 centistokes, preferably within the range of 90-130 centistokes (19 s-40 s, preferably 24 s-35 s, according to ASTM D1200 (Ford 4 cup)).

The sealing composition is prepared using the devices known to the person skilled in the art, by mixing the different components in the desired ponderal ratios until an homogeneous dispersion is obtained. Generally, the mixing is carried out at room temperature.

The sealing composition is deposited on at least one surface of at least one of the two elements to be joined.

In certain applications, however, the application of the sealing composition on both the surfaces of the two elements to be joined may be preferable.

The sealing composition is generally deposited in the form of a thin continuous layer along all the surface portion of the first element to be joined to the second element (contact surface). Alternatively, the sealing composition may also be deposited only in some points or parts of said contact surface.

The sealing composition may be deposited on the contact surface of the element or elements to be joined by using the devices and techniques known in the art, such as, for example: spraying, brush application, roll application, pad-printing, silk-screen printing or by a syringe.

The brush or roll application, for example, may be advantageously used for depositing the sealing composition on flat contact surfaces.

The application by pad-printing, for example, may be advantageously used for depositing the sealing composition on non-flat contact surfaces.

Once deposited the sealing composition, the second element may be positioned in contact with the sealing composition deposited on the first element.

If the sealing composition is deposited also on the second element, preferably the two elements are positioned with respect to one another, so that the two sealing compositions are in contact with each other.

The two elements and the sealing composition arranged between them are then subjected to heating for melting the glass frit and forming a sealing layer which steadily joins the two elements.

The heating of the glass frit is carried out at a temperature higher than its glass transition temperature ($T_g$) of the frit and lower than its crystallization temperature.

The temperature at which the heating is carried out is selected depending on the frit chemical composition; it may be, for example, within the range of 500-700° C., preferably within the range of 550-650° C.

The glass frit is maintained at the heating temperature for a time sufficient to obtain its softening and then its structural adhesion to the surfaces of the two elements to be joined.

The glass frit is maintained at the heating temperature, preferably, for a time of 20-240 minutes.

The formation of the sealing layer is obtained upon cooling the glass frit from the heating temperature to ambient temperature. Preferably, the cooling is carried out under controlled temperature conditions, so as to minimize the formation of stresses at the contact interface between the sealing layer and the material of the elements to be joined.

Preferably, after melting of the glass frit, its temperature is progressively decreased up to reach ambient temperature in a time within the range of 20-240 minutes, more preferably 40-120 minutes.

The glass frit heating may be carried out using the devices known in the art, in the field of glass processing, such as convection ovens (e.g. ovens for glass annealing) or irradiation devices (e.g. infrared devices or laser devices).

According to a preferred embodiment, the heating step of the glass frit at the melting temperature may be preceded by a pre-heating step for fixing the frit to the surface of the element, however without melting the frit. The element with the frit thus adhered can be handled more easily and rapidly.

The pre-heating temperature is lower than the $T_g$ of the glass frit (for example, within the range of 80-350° C.), but high enough to eliminate at least partially the dispersing liquid of the sealing composition (for example, by evaporation or combustion of the organic fraction). In the sealing compositions in which water is present, the adhesion effect may be obtained, for example by heating at a temperature within the range of 80-150° C., so as to eliminate water, at least partially.

The element with the frit adhered thereto may be put into contact with the second element to join; subsequently, the assembly comprising the two elements and the glass frit interposed between them—or only the frit—are subjected to heating at the melting temperature of the glass frit for forming the sealing layer.

The heating at the melting temperature of the glass frit may be carried out using a laser device. The use of a laser device provides the advantage of allowing the localized heating of the glass frit, without heating significantly the elements joined with said frit.

The heating by a laser device may be advantageously used in combination with a pre-heating step of the sealing composition applied.

When a radiant heating device is used, advantageously the glass frit may include also elements or compounds, particularly metallic components (e.g. transition metals or lanthanides, such as V, Fe and Nd), capable of improving the radiation absorption at certain wavelengths, so as to increase the selective heating effect of the glass frit.

According to an alternative embodiment of the present invention, the sealing composition may also comprise at least one thermosetting or photocurable resin.

The resin, as well as to facilitate the suspension of the glass frit in the sealing composition, may promote a quicker adhesion of the glass frit to the application surface, so that the element comprising the adhered frit can be handled in a short period of time.

Preferably, the thermosetting or photo-curable is present in the sealing composition in an amount within the range of 0.5-10% by weight with respect to the weight of the sealing composition.

The deposition of the sealing composition on the element may be made at room temperature or on a pre-heated element (e.g. at a temperature within the range of 80-150° C.), so as to promote the evaporation of the dispersing liquid and the adhesion of the glass frit on the glass element.

The sealing layer obtained by melting the frit is formed of a glass matrix structurally bonded to the glass matrix and/or to the matrix of the material which forms the element to which said glass is joined.

The sealing layer obtainable by using the above-described glass frits have properties of mechanical strength and chemical stability (low tendency to the release of chemical substances) fully comparable to the properties of glass.

Particularly, the sealing layer is able to resist to the contact with alcohol-containing substances even at high concentrations (e.g. liquors, perfumes, etc.) and products at high temperature (e.g. hot beverages), as well as resisting to wearing conditions, such as repeated washing cycles with alkaline detergents (e.g. domestic washing cycles) or the use in combination with rubbing tools (e.g. brushes or cooking utensils (forks, knives, etc.).

The sealing layer may be subjected to further treating processes, such as decorative or functional coating processes, such as painting and serigraphy processes.

The present invention will be described below with reference to the attached figures wherein:

FIG. 3 is a schematic representation of a section of the container of FIG. 1 performed along the section line II-II during the assembling step of the glass elements;

FIG. 4 is a schematic representation of an enlarged view of a detail of FIG. 2.

Figure 2:
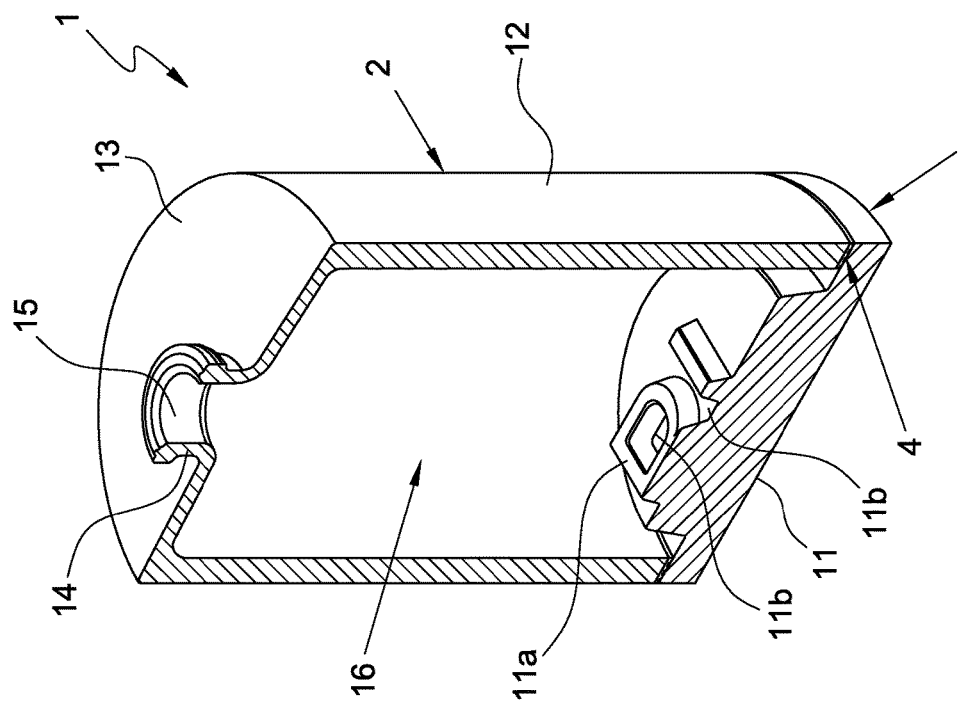
FIG. 2 is a schematic representation of a perspective view of the container of FIG. 1 performed along the section line II-II.
Figure 1:
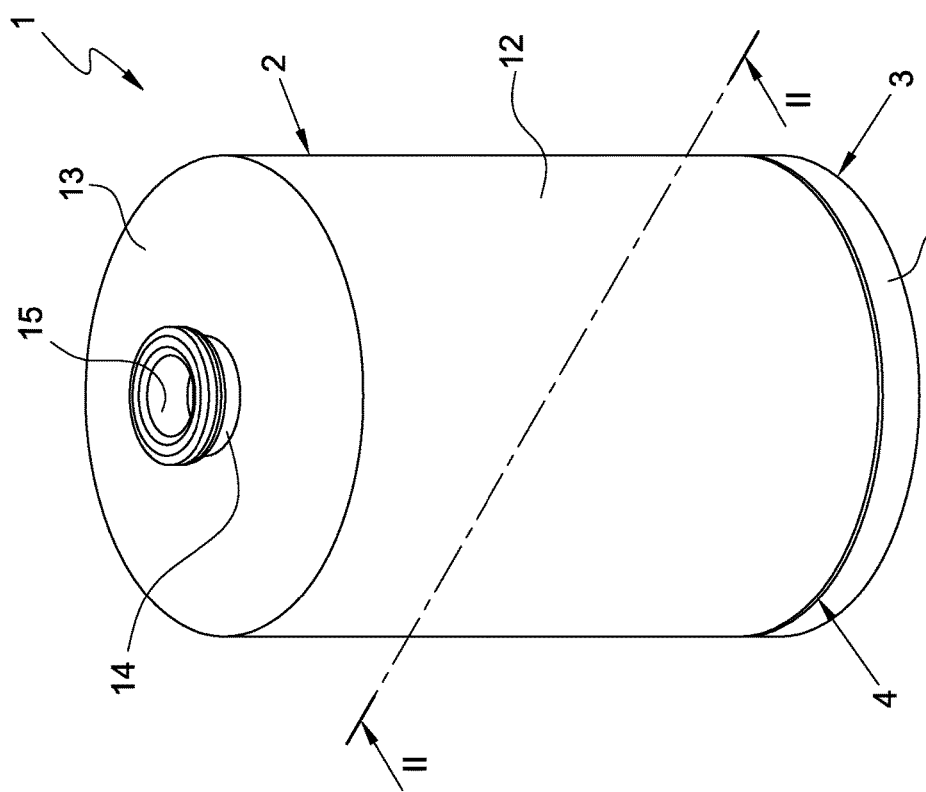
FIG. 1 is a schematic representation of a perspective view of a container according to the invention comprising two glass elements joined together.

The container 1 according to the present invention is a glass container in the form of bottle, such as, for example, a bottle for packing a perfume.

The container 1 comprises a first glass element 2 and a second glass element 3 which are joined by at least one sealing layer 4.

According to the embodiment shown in the attached figures, the first glass element 2, obtained for example by means of the blow-and-blow forming technique, comprises a cylindrical hollow body 12, a shoulder 13 and a neck 14 having a mouth 15. The second glass element 3, obtained for example by means of the forming technique of pressing, comprises a circular bottom 11 which delimits, together with the first element 2, a containment cavity 16 accessible through the mouth 15.

As visible in figures from 2 to 4, through the pressing technique, it is possible for example to confer to the bottom 11 of the second glass element 3 a personalized glass geometry, in which protrusions 11a and/or grooves 11b are provided which are positioned according to predetermined configurations.

The sealing layer 4 is obtained by heating a sealing composition which comprises a glass frit dispersed in a dispersing liquid. In the case of the container shown in the attached figures, the sealing composition is applied along the surface perimeter of the bottom 11 in the form of a continuous thin layer. If desired, the sealing composition may also be applied along the lower edge of the hollow cylindrical body 12.

According to a preferred embodiment, the sealing composition is preferably subjected to heating so as to eliminate the dispersing liquid and make the glass frit adhere to the surface of the round bottom 11.

In the assembling step, the hollow cylindrical body 12 of the first glass element 2 is positioned in contact with the glass frit adhered to the bottom 11 of the second glass element 3.

The glass frit is then subjected to heating at its melting temperature so as to soften it and make a structural welding between the first and the second glass element 2, 3. Upon cooling, the glass frit hardens forming the sealing layer 4 which joins the two glass elements 2, 3.

The following examples are provided for purely illustrative purposes of the present invention and should not be considered as limiting the scope of protection defined by the enclosed claims.

EXAMPLE 1

A sealing composition having the following composition was prepared: (weight percentages referred to the total weight of the sealing composition):
glass frit 67%
water 25%
dipropylene glycol 5%
surfactant 3%.

The viscosity of the sealing composition at 25° C. is equal to 125 centistokes (ASTM D1200—Ford cup 4—measure: 34 seconds).

The glass frit has the following composition (weight percentages referred to the frit weight):
32% $SiO_2$;
53% $Bi_2O_3$;
5% alkaline and alkaline-earth metal oxides (2% $Na_2O$, 1% CaO, 2% $K_2O$);
10% stabilizing oxides (4% ZnO, 2% $ZrO_2$, 2% $TiO_2$, 1% $Al_2O_3$, 1% $P_2O_5$).

The thermal expansion coefficient of the glass frit is equal to $85 \cdot 10^{-7}$ $K^{-1}$ (ISO 7991:1987).

The melting temperature of the glass frit is equal to 530° C.

The sealing composition was used for manufacturing a glass container in the form of bottle.

The container is composed of a first glass element (flat bottom of the bottle) formed by pressing and a second glass element (cylindrical body-shoulder-neck) formed by blow-and-blow. Both the elements are made from soda-lime glass. The containment cavity of the container has a capacity of 90 ml.

The sealing composition was applied on the perimeter edge of the bottle bottom using a roll applicator. The second glass element was then positioned in contact with the sealing composition deposited on the first glass element.

The assembled container was heated at 600° C. for 80 minutes and then cooled up to ambient temperature within 80 minutes obtaining a transparent sealing layer which joins the first and the second element.

The container of the present invention was tested for assessing the mechanical and thermal resistance of the sealing layer, as well as the suitability of the container as a whole for staying in contact with food and in prolonged contact with potentially aggressive substances.

For comparative purposes, two further containers of the same shape and capacity of the container according to the present invention were prepared by gluing the same glass elements with, respectively, a UV photo-curable polymeric glue (acrylic glue Loctite® 350, Henkel) and a hot melt glue (polyurethane glue, Henkel 475a)

Still for comparative purposes, a further mono-component container made of flint glass of the same external shape and capacity of the container according to the present invention was prepared through the blow-blow method.

The comparative containers were subjected to the same tests for characterizing the container according to the invention. The results of the tests are shown in Tables 1 and 2.

TABLE 1

| CONTAINER | MECHANICAL STRENGTH ISO 2409 | TOTAL MIGRATION DM 21 Mar. 1973 (Test performed in autoclave at 121° C., 1 bar) | CHEMICAL RESISTANCE IMMERSION G1 (24 h, ambient Temp.) | RESISTANCE TO DISHWASHER EN 12875-2 | THERMAL SHOCK UNI EN 1183 ($\Delta T = 50°$ C.) |
|---|---|---|---|---|---|
| FLINT GLASS CONTAINER (MONO-COMPONENT) | High Resistance; class: 0 | Releases = 3 mg/dm$^2$ | Resistance to abrasion by nails: >100 repetitions | 1500 washing cycles: Presence of evident lines that spoil the aesthetic of the product | Breakings = 0% |
| CONTAINER SEALED WITH UV GLUE | Insufficient Resistance; class: 3-4 | Total separation of the two components | No aesthetic alteration. Resistance to abrasion by nails = 0 repetitions | 200 washing cycles: Total separation of the two components | Breakings = 0% |
| CONTAINER SEALED WITH HOT MELT GLUE | Insufficient Resistance Class: 3-4 | Total separation of the two components | No aesthetic alteration. Resistance to abrasion by nails = 0 repetitions | 200 washing cycles: Total separation of the two components | Breakings = 0% |
| CONTAINER OF THE PRESENT INVENTION | High Resistance; Class: 0 | No aesthetic alteration. Releases = 3 mg/dm$^2$ | No aesthetic alteration. Resistance to abrasion by nails >100 repetitions | 1500 WASHING CYCLES: Presence of evident lines that spoil the aesthetic of the product | Breakings = 0% |

The results of the tests of Table 1 indicate that the container according to the present invention has the same characteristics of mechanical strength, chemical stability, resistance to chemical agents and thermal resistance of a mono-component container made of flint glass prepared by the blow-and-blow method.

TABLE 2

| TEST | DESCRIPTION | UV GLUE CONTAINER | HOT MELT GLUE CONTAINER | CONTAINER OF THE INVENTION |
|---|---|---|---|---|
| 1 MANUAL TRACTION | Manual separation test of the assembled product | C | C | C |
| 2 HANDLING OF THE SAMPLE IN THE PACKAGING | Repeated actions of insertion and extraction from the hive | C | C | C |
| 3 ABRASION GLASS AGAINST GLASS | Abrasion by reciprocal rubbing of bottles | C | C | C |
| 4 SIMULATION USING WITH G1 | Repeated spraying (3-5 spray a day) of a solution G1 for 10 days | NC | NC | C |
| 5 THERMAL CYCLE WITH G1 | Hot-cold cycle (−20° C.-+40° C.) using G1 as filling solution | NC | NC | C |
| 6 PARTIAL IMMERSION IN G1 | 24 hours immersion in solution G1 at ambient temperature | NC | NC | C |
| 7 PARTIAL IMMERSION IN HOT G1 | 4 hours in immersion in solution G1 at 55° C. | NC | NC | C |
| 8 THERMAL SHOCK FOR DECORATED GLASS | Hot-cold cycle (−20° C.-+40° C.) without the product | C | C | C |
| 9 THERMAL SHOCK FOR GLASS | Hot (60° C.) immersion and rapid transfer into cold water (20° C.) | C | C | C |
| 10 THERMAL CYCLE | 24 hours ageing at 50° C. and subsequent manual traction | NC | NC | C |

TABLE 2-continued

| TEST | DESCRIPTION | UV GLUE CONTAINER | HOT MELT GLUE CONTAINER | CONTAINER OF THE INVENTION |
|---|---|---|---|---|
| 11 CONTACT WITH ALCOHOL VAPORS | Exposure to alcohol vapors for 24 hours at 40° C. in a bell | NC | NC | C |
| 12 INTERNAL DECORATION - TEST AT 40° C. WITH G1 | Immersion in solution G1 at 40° C. for 10 days | NC | NC | C |

C = compliant (test passed)
NC = non-compliant (test not passed)

The tests of table 2 represent the tests of mechanical and chemical resistance which are typically carried out in the perfumery sector for assessing the suitability of a glass container for use in the packing of perfumes and cosmetic compositions in general.

The test results of table 2 show that the container according to the present invention is suitable for the use in the packing of cosmetic compositions, as it complies with all the requirements.

The results of the tests carried out on the comparative containers, instead, show that the glass containers assembled with UV and hot melt glues are not suitable for the use in the packing of cosmetic compositions, as they do not have the necessary characteristics of mechanical strength, chemical stability, mechanical and chemical resistance.

The invention claimed is:

1. A process for the manufacture of a glass container comprising the steps of:
   a) providing a first glass element;
   b) providing a second element made of a material selected from: glass, ceramic, metal and metallic alloy; said first element and said second element, joined together, defining a containment cavity of said glass container;
   c) depositing a sealing composition comprising at least one glass frit dispersed in at least one dispersing liquid on at least one surface of at least one of said first element and said second element, wherein said glass frit comprises, in percent by weight, based on the total weight of said glass frit:
   (i) 20%-40% $SiO_2$;
   (ii) 30%-70% $Bi_2O_3$;
   (iii) 1%-7% alkaline metal oxides;
   (iv) 1%-25% of stabilizing oxides selected from the group consisting of transition metal oxides, $Al_2O_3$ and $P_2O_5$;
   d) positioning said first element and said second element in contact with each other so that said sealing composition is arranged between said first element and said second element;
   e) heating said sealing composition so as to melt said glass frit and form a sealing layer between said first element and said second element wherein said heating to melt said glass frit is carried out at a temperature in the range 500° C.-700° C.

2. The process according to claim 1, wherein said first element and said second element are made of glass.

3. The process according to claim 1, wherein: said first element is made of glass and formed by a forming method selected from: pressing, blow-blow and press-blow; said second element is made of glass and formed by a forming method selected from: pressing, blow-blow and press-blow, said second element being formed by a different method from the method used to form said first element.

4. The process according to claim 1, wherein said container is a bottle.

5. The process according to claim 4, wherein said first element is a glass element formed by blow-blow or press-blow and comprises one or more of the following components of said bottle: mouth, neck, shoulder and body.

6. The process according to claim 1, wherein said container is a bottle and said second element is made of glass and is the bottom of said bottle, said bottom being formed by pressing or press-blow.

7. The process according to claim 6, wherein said first element is a glass element formed by blow-blow or press-blow and comprises one or more of the following components of said bottle: mouth, neck, shoulder and body.

8. The process according to claim 1, wherein the thermal expansion coefficient of said glass frit is within the range $10\text{-}100 \cdot 10^{-7}$ $K^{-1}$.

9. The process according to claim 1, wherein said glass frit comprises from 0.5% to 3% by weight of alkaline-earth metal oxides (percentages by weight referred to the total weight of the frit).

10. The process according to claim 1, wherein said glass frit has the following composition, in percent by weight, based on the total weight of said glass frit:
   (i) 20%-40% $SiO_2$;
   (ii) 30%-70% $Bi_2O_3$;
   (iii) 1%-7% alkaline metal oxides;
   (iv) 1%-25% stabilizing oxides selected from the group consisting of ZnO, $ZrO_2$, $Al_2O_3$ and $P_2O_5$.

11. The process according to claim 10, wherein said heating to melt said glass frit is carried out at a temperature in the range 550° C.-650° C.

12. The process according to claim 1, wherein said sealing composition deposited on at least said first element is heated to a temperature in the range 80° C.-350° C. to at least partially eliminate said dispersing liquid, before positioning said second element in contact with said first element.

* * * * *